US011592554B2

(12) United States Patent
Yamamoto

(10) Patent No.: US 11,592,554 B2
(45) Date of Patent: Feb. 28, 2023

(54) DISPLAY APPARATUS EQUIPPED WITH PROXIMITY SENSOR THAT SWITCHES DISPLAYS AND ELECTRONIC DEVICE

(71) Applicant: CANON KABUSHIKI KAISHA, Tokyo (JP)

(72) Inventor: Jiro Yamamoto, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 861 days.

(21) Appl. No.: 16/521,733

(22) Filed: Jul. 25, 2019

(65) Prior Publication Data

US 2020/0041645 A1 Feb. 6, 2020

(30) Foreign Application Priority Data

Aug. 1, 2018 (JP) ............................ JP2018-145164

(51) Int. Cl.
*G01S 17/08* (2006.01)
*G06F 1/3231* (2019.01)
*H04N 5/225* (2006.01)

(52) U.S. Cl.
CPC ............ *G01S 17/08* (2013.01); *G06F 1/3231* (2013.01); *H04N 5/2251* (2013.01)

(58) Field of Classification Search
None
See application file for complete search history.

(56) References Cited

U.S. PATENT DOCUMENTS 6,426,784 B1 * 7/2002 Sakai ................ G02F 1/133308 349/58
2009/0059490 A1 * 3/2009 Oogami ................ G06F 1/1656 361/679.55
2011/0221980 A1 * 9/2011 Kawabata ......... G02F 1/133308 348/794
2017/0177032 A1 * 6/2017 Cheng .................. G06F 1/1656
2018/0067212 A1 * 3/2018 Wilson .................... H04M 1/02
2018/0164942 A1 * 6/2018 Huffman ............... G06F 3/0416

FOREIGN PATENT DOCUMENTS

JP 11-167156 6/1999
JP 2001-339627 A 12/2001
JP 2013-083865 A 5/2013
JP 2015-184499 A 10/2015

OTHER PUBLICATIONS

The above foreign patent document was cited in the Aug. 2, 2022 Japanese Office Action, a copy of which is enclosed without an English Translation, that issued in Japanese Patent Application No. 2018-145164.

* cited by examiner

*Primary Examiner* — Edemio Navas, Jr.
(74) *Attorney, Agent, or Firm* — Cowan, Liebowitz & Latman, P.C.

(57) ABSTRACT

A display apparatus which is assembled in a favorable manner and increases reliability at low cost by keeping the length of a flexible printed circuit (FPC) to a minimum. The display apparatus has a display member, on which at least an image is displayed, and an exterior member which covers the display member. The display member has a proximity sensor that detects the approach of an object to be detected. The exterior member has a protective member that protects the proximity sensor. A fixing member that fixes the display member to the exterior member in a sensing direction of the proximity sensor is formed in the exterior member.

5 Claims, 6 Drawing Sheets

DISPLAY APPARATUS EQUIPPED WITH PROXIMITY SENSOR THAT SWITCHES DISPLAYS AND ELECTRONIC DEVICE

BACKGROUND OF THE INVENTION

Field of the Invention

The present invention relates to a display apparatus and an electronic device, and in particular to a display apparatus equipped with a display unit and a proximity sensor that switches display on the display unit.

Description of the Related Art

In general, some cameras which are electronic devices are equipped with a proximity sensing unit that detects a user peering through a viewfinder and switches displays, and this proximity sensing unit is disposed, for example, in proximity to the viewfinder.

The proximity sensing unit has, for example, a proximity sensor and a protective window, and the proximity sensor has a light emitting element and a light receiving element. The light emitting element transmits light, which in turn is reflected on a reflective object such as a user, and the light receiving element receives the reflected light to detect the approach of the reflective object.

When an impact or the like is given to the camera, the distance between the proximity sensor and protective window may change. The change in the distance may cause a change in the amount of cross talk resulting from reflection on a surface of the protective window, causing a sensing distance of the proximity sensor to change and consequently making it impossible to switch displays in a favorable manner.

To prevent such a situation, for example, a camera in which the proximity sensor and the protective window are held in pressure contact with an exterior unit of the camera is known (Japanese Laid-Open Publication (Kokai) No. 2013-83865).

According to the camera described in Japanese Laid-Open Publication (Kokai) No. 2013-83865, however, the proximity sensor is held with the exterior unit, and accordingly, it is necessary to perform the step of connecting a flexible printed circuit (FPC) when assembling an exterior, for example. This not only makes the assembly of the camera complicated but also increases cost because of the need to extend the FPC to the proximity sensor.

SUMMARY OF THE INVENTION

The present invention provides a display apparatus and an electronic device that enable assembly in a favorable manner and increase reliability by keeping the length of an FPC to a minimum.

Accordingly, the present invention provides a display apparatus including a display member on which at least an image is displayed, and an exterior member configured to cover the display member, wherein the display member comprises a proximity sensor that detects approach of an object to be detected, the exterior member comprises a protective member configured to protect the proximity sensor, and a fixing portion configured to fix the display member to the exterior member in a sensing direction of the proximity sensor is formed in the exterior member.

According to the present invention, assembly can be done in a favorable manner, and reliability is increased at low cost by keeping the length of an FPC to a minimum.

Further features of the present invention will become apparent from the following description of exemplary embodiments (with reference to the attached drawings).

DESCRIPTION OF THE EMBODIMENTS

Examples of a display apparatus and an electronic device according to an embodiment of the present invention will now be described with reference to the drawings.

Figure 1:
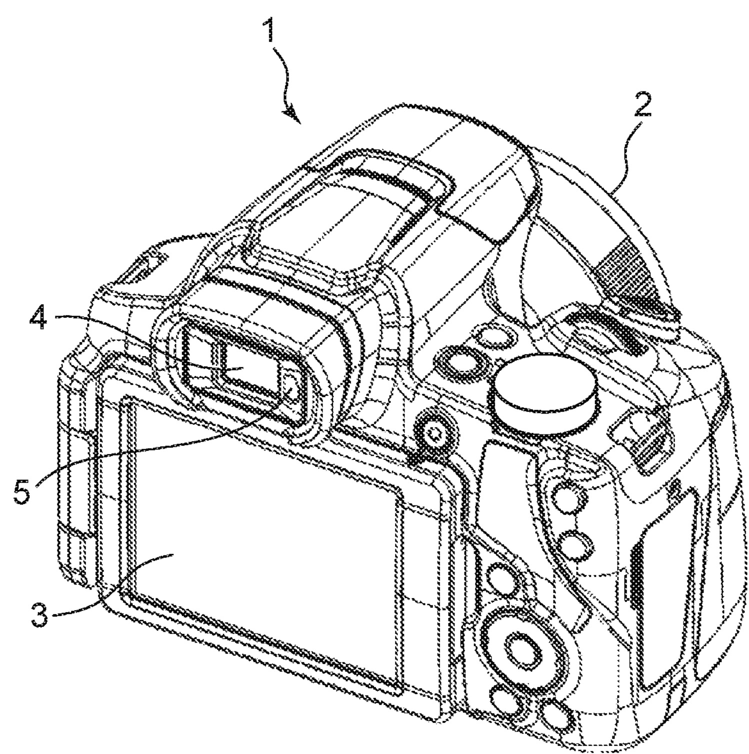
FIG. 1 is a perspective view showing an image pickup apparatus that is an example of an electronic device according to an embodiment of the present invention.

FIG. 1 is a perspective view showing an image pickup apparatus that is an example of the electronic device according to the embodiment of the present invention.

The image pickup apparatus shown in the figure is, for example, a digital camera (hereafter referred to merely as the camera). The camera 1 has a lens barrel 2 that causes an optical image (object image) to be formed on an image pickup device (not shown). A large monitor 3 and a viewfinder 4 are disposed on a rear side of a main body of the camera 1 so that a user can see an object image by means of the large monitor 3 and the viewfinder 4.

For example, when the user peers through the viewfinder 4, a CPU (not shown) provided in the camera 1 detects the approach (coming near) of a user's face (an object to be sensed) with a proximity sensing unit 5 (sensing member). The CPU then turns on a small monitor provided in the viewfinder 4 and turns off the large monitor 3. On the other hand, when the proximity sensing unit 5 detects the user's face moving away, the CPU turns off the small monitor and turns on the large monitor 3. Namely, the CPU controls turning on-off of the small monitor according to a result of detection by the proximity sensing unit 5.

Thus, the CPU provides control to switch displays by detecting whether or not the user is peering through the viewfinder 4 with the proximity sensing unit 5. This not only enables the user to focus on picture taking without feeling stressed but also reduces power consumption.

Figure 2:
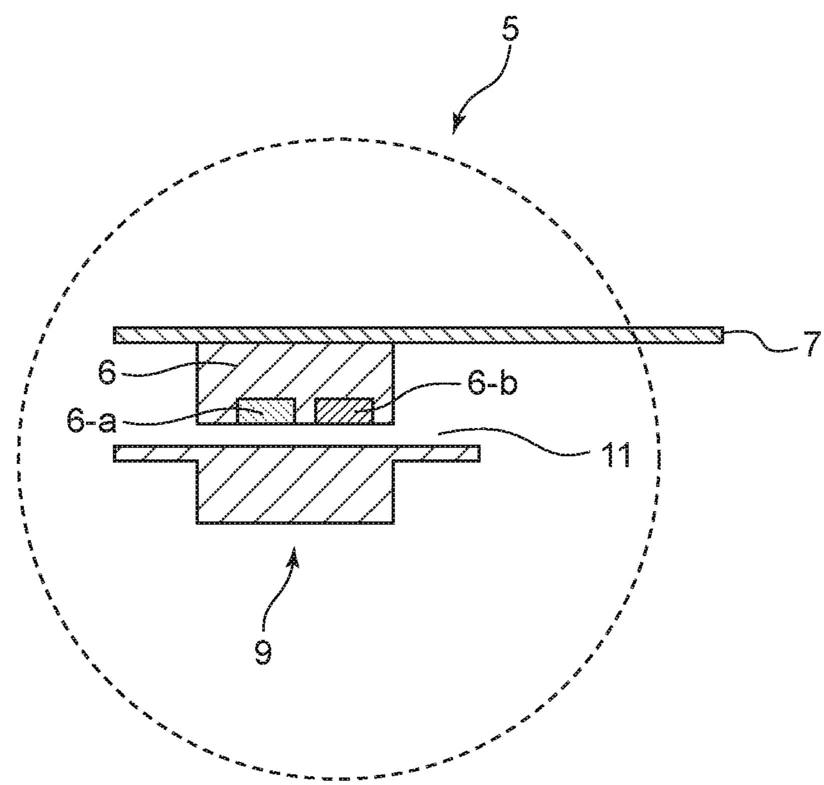
FIG. 2 is a view showing an example of a proximity sensing unit provided in a camera.

FIG. 2 is a view showing an example of the proximity sensing unit provided in the camera 1.

As shown in the figure, the proximity sensing unit 5 has a proximity sensor 6 and a protective window (protective member) 9. The proximity sensor 6 has a light emitting element (light emitting unit) 6-*a* and a light receiving element (light receiving unit) 6-*b*. The light emitting element 6-*a* and the light receiving element 6-*b* are configured as an integral unit. The proximity sensor 6 is implemented on an FPC 7.

In the example shown in the figure, infrared light emitted from the light emitting element 6-*a* is reflected on an object to be sensed (for example, a user's face), and the reflected light is received by the light receiving element 6-*b* to detect the approach of the object to be detected.

The infrared light emitted from the light emitting element 6-*a* is sometimes reflected on an inner surface or an outer surface of the protective window 9 and received as cross talk by the light receiving element 6-*b*. Thus, the amount of light reflected due to cross talk (the amount of cross talk) is preferably kept constant, and a gap 11 between the proximity sensor 6 and the protective window 9 is required to be a predetermined value (fixed value). However, when a strong impact is given to the camera 1, for example, to widen the gap 11 between the proximity sensor 6 and the protective window 9, the amount of cross talk will increase. The increase in the amount of cross talk may make it impossible to correctly detect whether or not the user's face has come near.

The gap 11 can be made stable by configuring the proximity sensor 6 with an exterior unit (exterior member) having the protective window 9, but as described earlier, this requires connection of the FPC at the time of exterior assembly. This makes the assembly of the camera complicated and also increases cost because of the need to extend the FPC.

Figure 3:
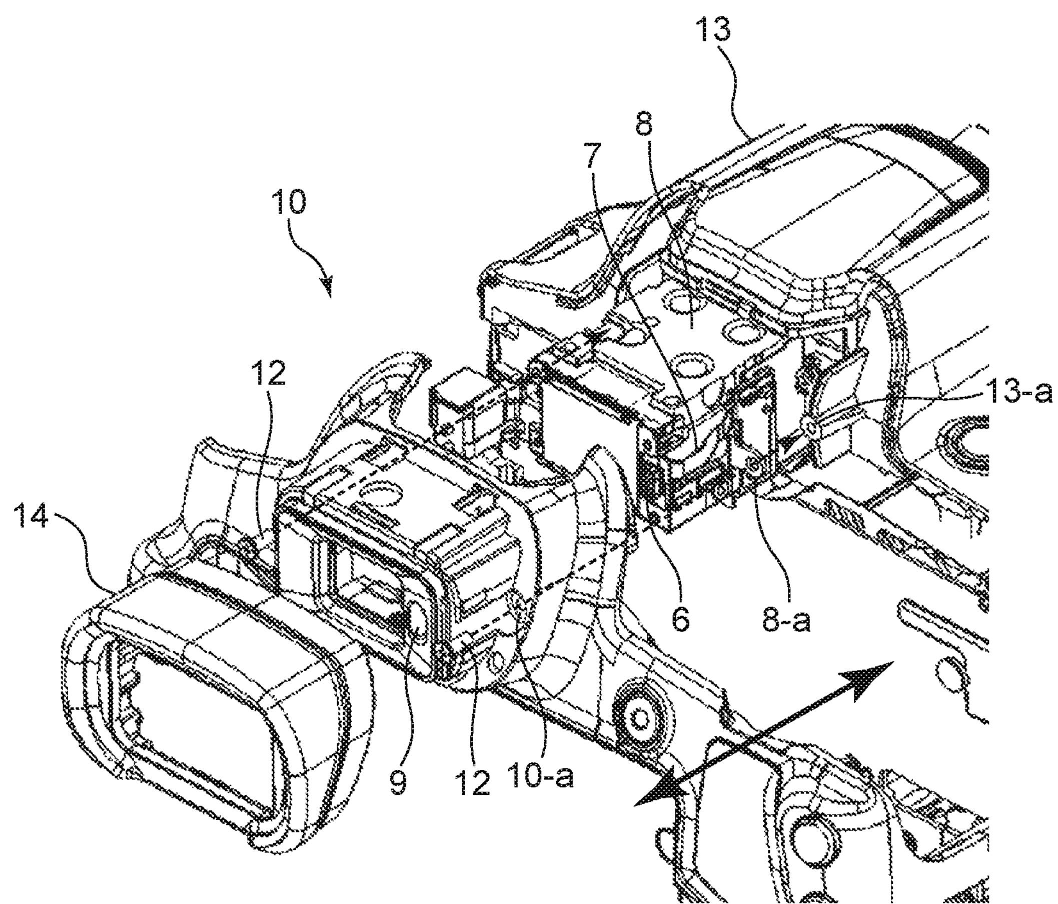
FIG. 3 is a partially exploded perspective view showing the camera appearing in FIG. 1.

FIG. 3 is a partially exploded perspective view showing the camera appearing in FIG. 1.

As shown in the figure, the proximity sensor 6 is attached to the display unit 8 (display member). On the other hand, the protective window 9 is attached to the exterior unit 10. The display unit 8 is equipped with display unit fixing portions 8-*a*, and the exterior unit 10 is equipped with exterior fixing portions 10-*a*.

In the exterior unit 10, upper face exterior fixing portions 13-*a* are provided in an upper face exterior (structural member) 13 which abuts against the proximity sensor 6 in a sensing direction thereof (a direction indicated by a solid arrow). Two screws 12 which hold the display unit 8 between them (that is, penetrate the display unit 8) are fastened to the upper face exterior fixing portions 13-*a* in the sensing direction of the proximity sensor 6 via the exterior fixing portions 10-*a* and the display unit fixing portions 8-*a*.

As a result, the exterior unit 10 has only to be equipped with the protective window 9 constituting the proximity sensing unit 5, and this makes work during the assembly of the camera efficient. Furthermore, as compared to a case where the proximity sensor 6 is provided on the exterior unit side, the length of the FPC 7 can be kept to a minimum, keeping costs low.

Figure 4:
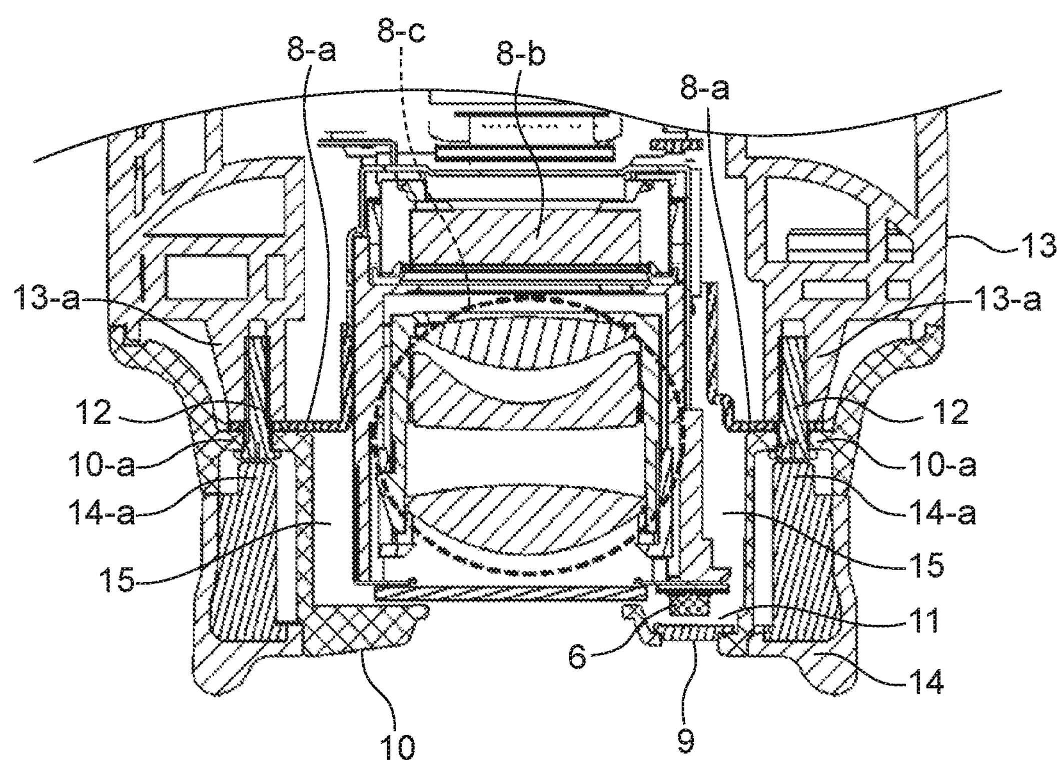
FIG. 4 is a cross-sectional view showing a state in which only a part of the camera has been put together appearing in FIG. 3.

FIG. 4 is a cross-sectional view showing a state in which a part of the camera appearing in FIG. 3 has been put together.

The exterior unit 10 with the protective window 9 is joined to and fixed to the display unit fixing unit 8-*a* of the display unit 8, which is equipped with the proximity sensor 6, and the upper face exterior fixing portion 13-*a* of the upper surface exterior 13 with the two screws 12.

This prevents the protective window 9 and the proximity sensor 6 from moving relatively to the sensing direction of the proximity sensor 6 and consequently keeps the gap 11 constant.

After the screws 12 are fastened, a cap (cap member) 14 is attached to the exterior unit 10 by snap fitting. The cap 14 (cap member) is formed in two colors of an elastomer which is an elastic body and a hard thermoplastic resin.

The cap 14, an exterior surface of which is formed of the elastomer that is an elastic body, protects a display surface of the display unit 8 from an impact when the camera falls. Also, when the user wears eyeglasses, the cap 14 prevents the eyeglasses from being scratched. An interior of the cap 14 is formed of the hard thermoplastic resin, and hence the cap 14 can be firmly fixed by snap fitting, preventing the cap 14 from unexpectedly falling off when the camera 1 is in use.

Furthermore, in the cap 14, the hard thermoplastic resin abuts against the screws 12, or convex portions 14-*a* with a slight clearance (separated a predetermined amount from the screws 12) are formed in the hard thermoplastic resin. Namely, the convex portions 14-*a* projected toward the screws 12 are formed at locations corresponding to the exterior fixing portions 10-*a* in the cap 14. Ends of the respective convex portions 14-*a* abut against or are separated a predetermined amount from the screws 12.

Since the convex portions 14-*a* are formed, tops of the screws 12 are held by the convex portions 14-*a* even when the screws 12 slightly loosen from the upper exterior fixing portions 13-*a* due to an impact given to the camera 1 when, for example, the camera 1 falls. As a result, the screws 12 are prevented from loosening further.

Moreover, even when the cap 14 is deformed due to collision with a floor surface when, for example, the camera 1 falls, the convex portions 14-*a* abut against the tops of the screws 12 to prevent further deformation thereof. Namely, even when an impact or the like is given to the camera 1, the gap 11 between the proximity sensor 6 and the protective window 9 can be kept constant.

As shown in FIG. 4, the display unit 8 has a small monitor 8-*b* and also has an optical lens 8-*c* which enlarges what is displayed on the small monitor 8-*b* and adjusts its focal position according to user's visibility. Thus, when an external force is given to the display unit 8, the position of the optical lens 8-*c* shifts to make what is displayed on the small monitor 8-*b* look blurred or distorted.

Therefore, in the example shown in the figure, the display unit 8 has a space 15 defined so as not to be in contact with the exterior unit 10 at locations other than the locations at which the display unit fixing portions 8-*a* are formed. As a result, even when the exterior unit 10 is deformed to some degree due to an impact given to the camera 1 when, for example, the camera 1 falls, the position of the optical lens 8-*c* does not change, and the user can always visually recognize a predetermined clear image.

Figure 5:
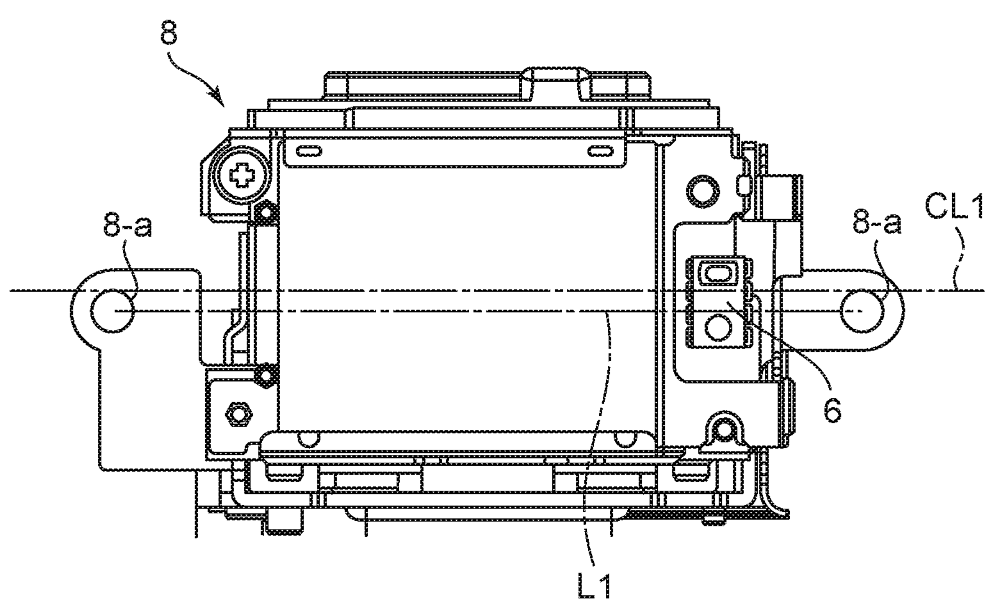
FIG. 5 is a view useful in explaining an example of a display unit appearing in FIG. 4.

FIG. 5 is a view useful in explaining an example of the display unit appearing in FIG. 4.

The display unit fixing portions 8-*a* are formed at two locations in the display unit 8. A straight line L1 (a first straight line) connecting these display unit fixing portions 8-*a* together is close to and parallel to a center line CL1 (a first center line extending in a predetermined direction) of the display unit 8.

By prescribing this relationship, the display unit 8 can be fixed in proximity to its center of gravity, and hence even when an impact or the like is given to the camera 1, the display unit 8 resists being displaced Moreover, the proximity sensor 6 is located on the straight line L1 (on the first straight line), and hence the proximity sensor 6 is held such that it resists being displaced.

Figure 6:
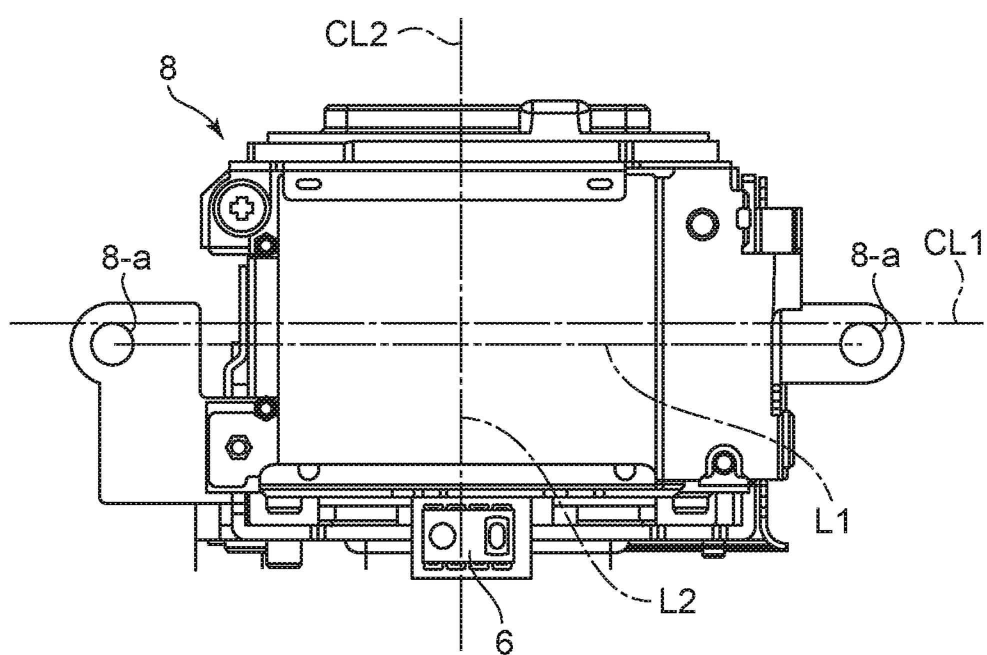
FIG. 6 is a view useful in explaining another example of the display unit appearing in FIG. 4.

FIG. 6 is a view useful in explaining another example of the display unit appearing in FIG. 4.

In the example shown in FIG. 6, the display unit fixing portions 8-*a* are also formed at two locations in the display unit 8 as with the example shown in FIG. 5. The straight line L1 connecting these display unit fixing portions 8-*a* together is close to and parallel to the center line CL1 of the display unit 8 in a horizontal direction (predetermined direction).

As a result, as described earlier, the display unit 8 is fixed in proximity to its center of gravity, and hence even when an impact or the like is given to the camera 1, the display unit 8 resists being displaced.

Furthermore, in the example shown in FIG. 6, a straight line L2 (a second straight line), which passes through a middle point of the straight line L1 substantially matches a center line CL2 (a second straight line) of the display unit 8 in a vertical direction. The proximity sensor 6 is located on the straight line L2 (the second straight line). As a result, the proximity sensor 6 is held such that it resists being displaced.

As described above, in either the case where the proximity sensor 6 is placed in the horizontal direction of the display unit 8 or the case where the proximity sensor 6 is placed in the vertical direction of the display unit 8, the positional relationship between the display unit fixing portions 8-*a* and the proximity sensor 6 can be optimized.

As described above, according to the embodiment of the present invention, the camera can be assembled in a favorable manner, and reliability can be increased at low cost by keeping the length of the FPC to a minimum.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145164, filed Aug. 1, 2018, which is hereby incorporated by reference herein in its entirety.

What is claimed is:

1. A display apparatus comprising:

a display member on which at least an image is displayed;

an exterior member configured to cover the display member; and a cap member configured to protect a display surface of the display member, wherein the display member comprises a proximity sensor that detects approach of an object to be detected, the exterior member comprises a protective member configured to protect the proximity sensor, and a fixing portion configured to fix the display member to the exterior member in a sensing direction of the proximity sensor is formed in the exterior member, wherein the exterior member is fixed to the display member at the fixing portion with a screw, wherein the fixing portion is covered with the cap member, and wherein in the cap member, a convex portion projected toward the screw is formed at a location corresponding to the fixing portion, and an end of the convex portion abuts against the screw or is separated a predetermined amount from the screw.

2. An electronic device comprising:

a display member on which at least an image is displayed;

an exterior member configured to cover the display member; and a main body with a mounting seat on which the display member is mounted;

wherein the display member comprises a sensing member that detects approach of an object to be detected, and a display member fixing portion that is fixed to the mounting seat, and the exterior member comprises a protective member configured to protect the sensing member, and a fixing portion configured to fix the display member fixing portion to the mounting seat in a sensing direction of the sensing member, wherein two display member fixing portions are formed in the display member, a first straight line that connects the display member fixing portions together is close to and parallel to a first center line in a predetermined direction of the display member, and a second straight line passing through a middle point of the first straight line and perpendicular to the first straight line matches a second center line of the display member which is perpendicular to the first center line, and wherein the sensing member is located on the second straight line.

3. The electronic device according to claim 2, wherein the display member fixing portion is fixed to the mounting seat of the fixing member with a screw.

4. An electronic device comprising:

a display member on which at least an image is displayed;

an exterior member configured to cover the display member; and a main body with a mounting seat on which the display member is mounted;

wherein the display member comprises a sensing member and a display member fixing portion that is fixed to the mounting seat, and the exterior member comprises a fixing portion configured to fix the display member fixing portion to the mounting seat in a sensing direction of the sensing member, wherein a plurality of display member fixing portions are formed in the display member, a first straight line that connects the display member fixing portions together is close to and parallel to a first center line in a predetermined direction of the display member, and a second straight line passing through a middle point of the first straight line and perpendicular to the first straight line matches a second center line of the display member which is perpendicular to the first center line, and wherein the sensing member is located on the second straight line.

5. The electronic device according to claim 4, wherein the display member fixing portion is fixed to the mounting seat of the fixing member with a screw.

* * * * *